Jan. 31, 1928. 1,657,892
J. F. MULDOON
FISHING NET
Filed June 29, 1927 2 Sheets-Sheet 1
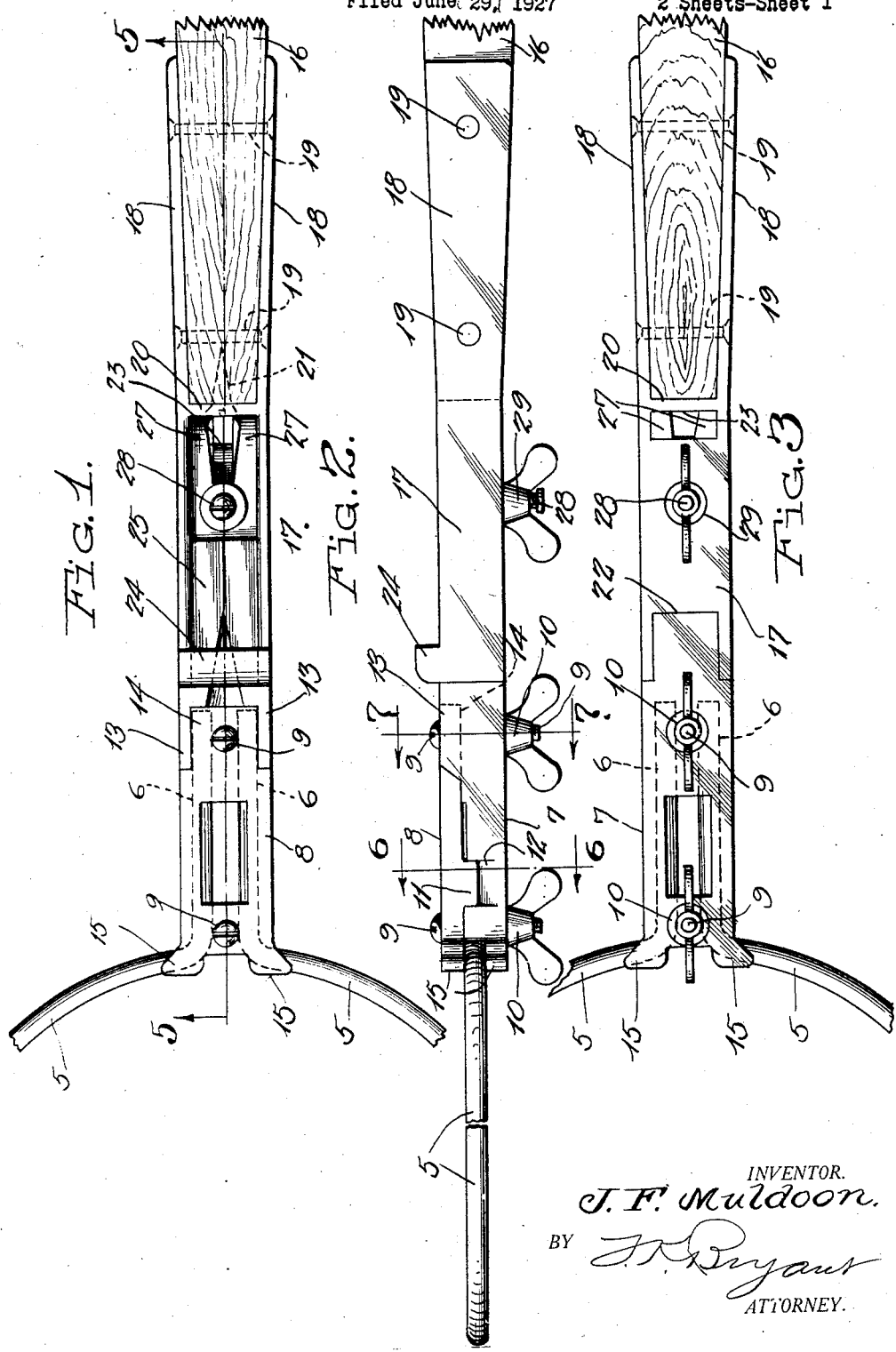
INVENTOR.
J. F. Muldoon.
BY
ATTORNEY.

Jan. 31, 1928.  
J. F. MULDOON  
FISHING NET  
Filed June 29, 1927
1,657,892
2 Sheets-Sheet 2
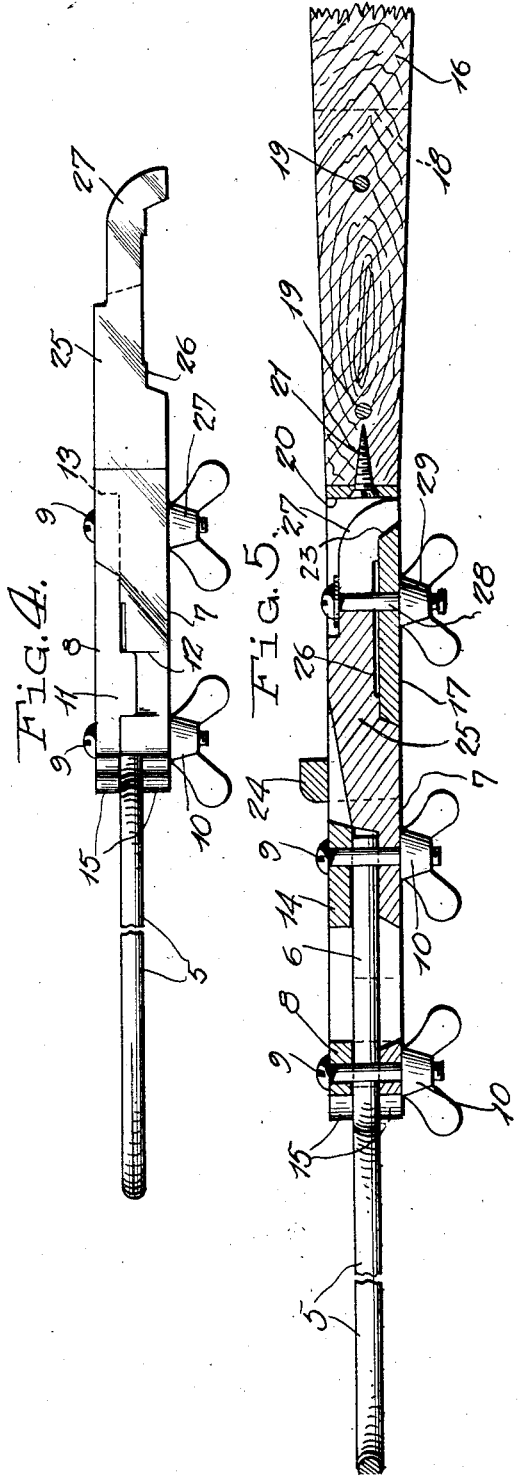
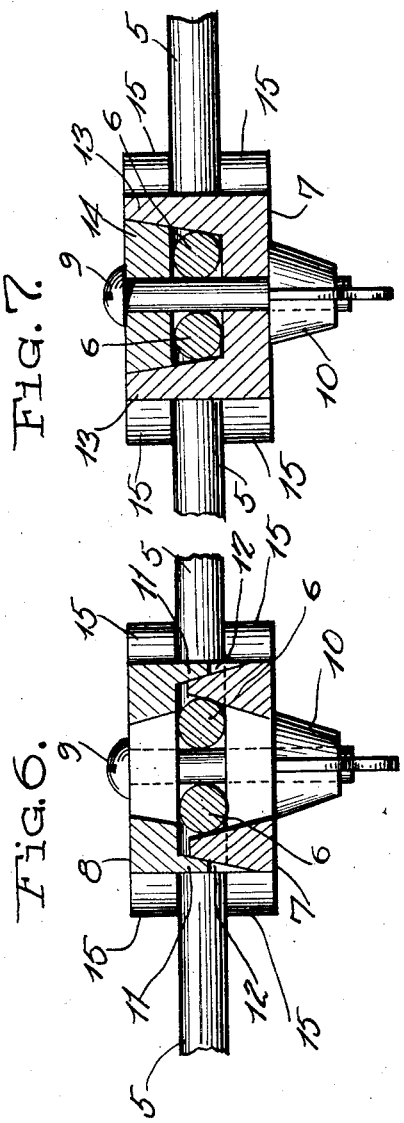
INVENTOR.  
J. F. Muldoon.  
BY  
ATTORNEY.

Patented Jan. 31, 1928.

1,657,892

UNITED STATES PATENT OFFICE.

JAMES F. MULDOON, OF AUBURN, NEW YORK.

FISHING NET.

Application filed June 29, 1927. Serial No. 202,179.

This invention relates to improvements in fishing nets, and has more particular reference to dip nets such as are commonly employed for landing fish caught upon a fishing line or the like.

The primary object of the present invention is to provide simple and efficient means adapted to be carried by a suitable handle, for removably holding the net-carrying loop, whereby worn or damaged nets may be conveniently and expeditiously removed and replaced by new ones, or whereby net holding loops of various sizes may be conveniently interchangeably employed as found necessary or desirable.

A further important object of the present invention is to provide simple and efficient means for removably and rigidly attaching the loop holder to a suitable handle, whereby the parts may be conveniently and expeditiously assembled for use or taken apart for convenience in transporting or storing the device.

Another object is to provide a device characterized as above and embodying simple and durable construction to render the device especially serviceable for use in the landing of relatively large fish.

Other objects will become apparent as the nature of the invention is better understood, and the same consists in the novel form, combination and arrangement of parts hereinafter more fully described, shown in the accompanying drawing and claimed.

In the drawing, wherein like reference characters indicate corresponding parts throughout the several views, Figure 1 is a fragmentary bottom plan view of a fish landing net or implement having a loop holder and handle connection embodying the present invention;

Figure 2 is an inverted side elevational view thereof;

Figure 3 is a top plan view of the same;

Figure 4 is an inverted side elevational view of the net carrying loop and its holder removed from the handle socket;

Figure 5 is a central longitudinal section taken upon line 5—5 of Figure 1;

Figure 6 is an enlarged transverse section taken upon line 6—6 of Figure 2; and

Figure 7 is an enlarged transverse section taken upon line 7—7 of Figure 2.

Referring more in detail to the drawings, 5 indicates the split loop or ring onto which the open end of the usual net, not shown, is adapted to be secured or threaded in a manner generally well known in the art, and this loop or ring is preferably composed of a stiff piece of heavy gage wire or cylindrical rod material suitably bent into circular shape with its free end portions projecting outwardly in the plane of the loop in spaced but adjacent parallel relation as indicated at 6.

The loop or ring 5 is removably carried by a holder in the form of a clamp composed of an upper clamping member 7 of longitudinally channeled form adapted to receive the projecting ends 6 of the loop 5 snugly in the channel thereof, and a bottom clamping plate 8 adapted to overlie the ends 6 of the loop 5 and to be secured in contact therewith and to the clamp member 7 by means of clamping bolts 9 extending through pairs of aligned openings in the clamp members 7 and 8 and preferably having wing nuts 10 removably threaded upon the projecting ends thereof at one side of the clamp. As shown clearly in Figures 5 to 7 inclusive, the clamping bolts 9 extend through the opposite ends of the clamp members and are disposed centrally of the latter so as to pass between the ends 6 of the loop 5 so that they are maintained in their proper spaced parallel relation and in contact with the inner surfaces of the side flanges of the top clamp member 7.

Means is provided to effectively guide the clamp members into proper association and to brace the same against relative lateral displacement from lateral strain. For this purpose, the forward portion of the clamp member 8 is provided with upstanding side guide lugs 11 having upwardly and outwardly beveled inner surfaces, and the adjacent portions of the top clamping member 7 are provided with external vertical grooves 12 adapted for snug reception of the lugs 11 when the clamp members are assembled, the grooves having inwardly and downwardly inclined bottom walls cooperating with the inclined inner surfaces of the lugs 11 to provide for a wedging action such as will guard against any relative lateral play between the clamp members when they are assembled. Further, the inner ends of the side flanges of the clamp member 7 are provided with downward extensions 13, and the lower clamp member 8 is reduced in width at its inner end to provide a narrow portion 14 adapted for snug reception between the extensions 13 to further guard against lateral play and strain upon the clamping bolts.

The forward ends of the clamp members 7 and 8 are provided with pairs of opposed outwardly and laterally projecting extensions 15 adapted to firmly grip the portions of the net carrying loop 5 at the points of connection between the body portion of said loop 5 and the projecting end 6 thereof, so as to relieve or prevent such bending strain as might cause weakening at these points and ultimate breaking of the ends 6 from the body of the loop 5.

As is usual in this class of devices, the net carrying loop is adapted to be mounted upon a suitable relatively long handle or staff 16, only the adjacent or outer end portion of which is shown. For this purpose, an inverted channel-shaped socket member 17 is rigidly attached at one end to the outer end of the handle 16, preferably by fitting the latter snugly between projecting side bars 18 rigid with the adjacent end of the socket member 17 and coextensive with the side flanges of the latter, the handle being permanently secured in place between the bars 18 by riveting or the like as at 19 through the bars 18 and the adjacent end of the handle 16. Further, the inner end of the socket member 17 is preferably closed by means of a transverse wall 20 rigidly connecting the inner ends of the side flanges of the socket member 17 and adapted to flatly abut the outer end of the handle 16 as shown clearly in Figures 1 and 5, and threaded into the end of the handle 16 through an opening in the wall 20 is a wood screw 21 which further aids in rigidly fastening the handle to the socket member.

As shown more clearly in Figures 3 and 5, the top wall of the socket member 17 is cut away at the ends to provide a recess 22 at the forward end of the socket member and an opening 23 at the inner end of the latter, and connecting the lower edges of the side flanges of the socket member 17 at the outer end of the latter is a cross bar 24. Rigid with the inner end of the clamp member 7 is a shank or tang 25 adapted to be removably slid into the socket member and having a top recess 26 adapted to receive the remaining or existing top wall of the socket member 17 as shown in Figure 5. The walls at the outer and inner ends of the recess 26 of the tang 25, are adapted to abut the end edges of the top wall of the socket member 17 when the parts are assembled, and the inner free end portion of the tang or shank 25 is longitudinally bifurcated to define a pair of upwardly directed hook members 27 which engage the rear or inner edge of the top wall of member 17 as is clearly shown in Figure 5. The outer or lower edges of the hook members 27 are rounded as clearly shown, and passing between said hook members and through an opening in the top wall of the socket member 17 is a clamping bolt 28 having a wing nut 29 threaded thereon whereby the shank 25 is firmly bolted to the socket member with the top wall of the latter snugly seated in the recess 26 and the hook members 27 engaged behind the inner edge of the top wall of the socket member as shown. By reason of this construction it will be seen that the parts are effectively held assembled with the shank 25 restrained against lateral movement between the side flanges of the socket member 17 and against separation in a vertical direction by means of the cross bar 24 and the clamping bolt 28. It will, however, be seen that upon loosening the wing nut 29 the rear end portion of the shank 25 will be partly released so that said shank 25 may be tilted to disengage the hook members 27 from behind the top wall of the socket member 17 and simultaneously raise the outer end portion of the shank 25 away from the cross bar 24. As the hook members 27 disengage from behind the top wall of the socket member 17, the shank 25 may be slid outwardly to be entirely removed from the socket member and to thereby effect detachment of the loop holder from the handle for convenience in transporting or storing the device. Obviously, a reversal of this operation is necessary to assemble the device and firmly rigidly secure the shank 25 in the socket member 17 as illustrated in Figures 1 to 3 inclusive and 5. Naturally, when the shank 25 is operatively held in the socket member 17, the free ends of the hook members 27 will project upwardly into the opening 23 for engaging behind the inner end edge of the top wall of socket member 17 as shown in Figure 3. The rounded outer edges of the hook members 27 permit the necessary tilting of the shank 25 when the nut 29 is loosened.

From the above description it will be seen that I have provided a simple and durable construction by means of which the net holding loop may be removably mounted in a holder and by means of which the holder may be detachably connected to a handle, whereby the net or net carrying loop may be readily changed or replaced, and whereby the mounted net carrying loop may be readily applied to or removed from the handle without danger of relative derangement of the net and loop.

Minor changes may be made without departing from the spirit and scope of the invention as claimed.

Accidental detachment of nut 29 from bolt 28 is prevented by heading the free end of the shank of said bolt as shown, thereby guarding against loss of the nut.

What I claim as new is:—

1. In a fish landing net, a split net-carrying loop having spaced projecting ends, a holder for the loop including a clamp removably engaging said projecting ends of the loop and embodying a pair of clamping members, a shank rigid with one of said clamp members, a handle having a socket member for removable reception of said shank, and means to removably secure the shank in said socket member.

2. In a fish landing net, a split net-carrying loop having adjacent spaced projecting ends, and a holder for the loop embodying a channel-shaped clamping member adapted to snugly receive said projecting ends of the loop therein, a second clamping member adapted to overlie said ends of the loop, and releasable means to draw the clamping members together.

3. In a fish landing net, a split net-carrying loop having adjacent spaced projecting ends, and a holder for the loop embodying a channel-shaped clamping member adapted to snugly receive said projecting ends of the loop therein, a second clamping member adapted to overlie said ends of the loop, and releasable means to draw the clamping members together, said last named means embodying clamping bolts extending through the ends of the clamping members and passing between said ends of the loop.

4. In a fish landing net, a split net-carrying loop having adjacent spaced projecting ends, and a holder for the loop embodying a channel-shaped clamping member adapted to snugly receive said projecting ends of the loop therein, a second clamping member adapted to overlie said ends of the loop, and releasable means to draw the clamping members together, said last named means embodying clamping bolts extending through the ends of the clamping members and passing between said ends of the loop, said ends of the loop being straight and in parallel relation to permit longitudinal separation of the loop and holder upon loosening said clamping bolts.

5. In a fish landing net, a split net-carrying loop having adjacent spaced projecting ends, and a holder for the loop embodying a channel-shaped clamping member adapted to snugly receive said projecting ends of the loop therein, a second clamping member adapted to overlie said ends of the loop, releasable means to draw the clamping members together, and pairs of opposed extensions on the forward ends of the clamping members adapted to grip the loop at the points of connection between the body portion and ends of the latter.

6. In a fish landing net, a split net-carrying loop having adjacent spaced projecting ends, and a holder for the loop embodying a channel-shaped clamping member adapted to snugly receive said projecting ends of the loop therein, a second clamping member adapted to overlie said ends of the loop, releasable means to draw the clamping members together, said channel-shaped clamping member having external tapered grooves in the forward side portions thereof, and tapered upstanding lugs on the second clamp member adapted to enter said grooves.

7. In a fish landing net, a split net-carrying loop having adjacent spaced projecting ends, and a holder for the loop embodying a channel-shaped clamping member adapted to snugly receive said projecting ends of the loop therein, a second clamping member adapted to overlie said ends of the loop, releasable means to draw the clamping members together, said channel-shaped clamping member having external tapered grooves in the forward side portions thereof, tapered upstanding lugs on the second clamp member adapted to enter said grooves, said depending extensions on the inner side portions of said channel-shaped clamping member, said second clamping member having its inner end reduced in width for snug reception between said depending extensions.

8. In a fish landing net, a loop holder having a projecting shank recessed at its upper side and bifurcated at its free end, a socket member of inverted channel form adapted for snug reception of said shank and having a top wall adapted to snugly seat in the recess of the shank, a cross bar rigidly connecting the lower edges of the sides of the socket member at the outer end of the latter in position to underlie said shank, and a clamping bolt passing through the top wall of the socket member and between the bifurcations of the shank.

9. In a fish landing net, a handle having a socket, a loop holder having a shank, said socket and shank being cooperatively constructed to permit longitudinal assembly or separation thereof and to effect an interlocking relation therebetween when assembled, means to releasably hold said socket and shank in assembled interlocking relation, and means to prevent separation of the socket and shank unless the latter are relatively tilted.

10. In a fish landing net, a loop holder having a projecting shank recessed at its upper side and bifurcated at its free end, a socket member of inverted channel form adapted for snug reception of said shank and having a top wall adapted to snugly seat in the recess of the shank, a cross bar rigidly connecting the lower edges of the sides of the socket member at the outer end of the latter in position to underlie said shank, and a clamping bolt passing through the top wall of the socket member and between the bifurcations of the shank, the bifurcations of the shank defining upwardly directed hook members having rounded outer edges to permit tilting of the shank relative to the socket member, whereby separation of the shank and socket member may be had upon loosening said clamping bolt.

In testimony whereof I affix my signature.

JAMES F. MULDOON.